United States Patent [19]

Matsumura et al.

[11] Patent Number: 5,652,766
[45] Date of Patent: Jul. 29, 1997

[54] DATA TRANSMITTING AND RECEIVING METHOD AND APPARATUS THEREOF

[75] Inventors: Noboru Matsumura; Kazuaki Okuyama; Mitsuru Kashimura, all of Tokyo, Japan

[73] Assignee: Sony Corporation, Tokyo, Japan

[21] Appl. No.: 281,930

[22] Filed: Jul. 28, 1994

[30] Foreign Application Priority Data

Aug. 3, 1993 [JP] Japan .................................. 5-212383

[51] Int. Cl.⁶ .................................................. H04L 27/04
[52] U.S. Cl. ................... 375/295; 375/3.16; 340/825.25; 370/476
[58] Field of Search ................................... 375/295, 316; 370/82, 83, 99, 102; 381/31; 348/141; 340/825.25

[56] References Cited

U.S. PATENT DOCUMENTS

| | | | |
|---|---|---|---|
| 4,514,732 | 4/1985 | Hayes, Jr. ............... | 455/603 |
| 4,517,669 | 5/1985 | Freeburg et al. ........... | 370/82 |
| 4,519,068 | 5/1985 | Krebs et al. .............. | 370/82 |
| 4,594,708 | 6/1986 | Servel et al. .............. | 370/99 |
| 4,825,209 | 4/1989 | Sasaki et al. ............. | 340/825.72 |
| 4,845,751 | 7/1989 | Schwab .................... | 381/25 |
| 5,132,989 | 7/1992 | Bellon ..................... | 370/99 |
| 5,247,923 | 9/1993 | Nakagawa .................. | 340/825.25 |
| 5,333,135 | 7/1994 | Wendorf ................... | 370/99 |
| 5,469,152 | 11/1995 | Yamamoto et al. ........... | 340/825.63 |

FOREIGN PATENT DOCUMENTS

| | | |
|---|---|---|
| 0637796 | 2/1908 | European Pat. Off. . |
| 0075317A2 | 3/1983 | European Pat. Off. . |
| WO87/05455 | 9/1987 | WIPO . |

OTHER PUBLICATIONS

Patent Abstracts of Japan, vol. 16, No. 447 (E–1266), 17 Sep. 1992 & JP-A-04 156 796 (Sharp Corp), 29 May 1992.

Patent Abstracts of Japan, vol. 12, No. 166 (P–704), 19 May 1988 & JP-A-62 279 585 (ASCII Corp), 4 Dec. 1987.

Patent Abstracts of Japan, vol. 15, No. 360 (P–1250), 11 Sep. 1991 & JP-A-03 139 694 (Fujitsu Kiden Ltd.), 13 Jun. 1991.

Patent Abstracts of Japan, vol. 9, No. 270 (E–353), 26 Oct. 1985 & JP-A-60 116 251 (Nippon Denki KK), 22 Jun. 1985.

*Primary Examiner*—Stephen Chin
*Assistant Examiner*—T. Ghebretinsae
*Attorney, Agent, or Firm*—Limbach & Limbach L.L.P.

[57] ABSTRACT

A two-way transmitting apparatus which transmits display data and audio signal from an audio reproducing device to a remote controller and headphones with display by wireless transmitting, and transmits control signals to the audio reproducing apparatus according to one of the operation of a plurality of operation unit established on the remote controller and the headphones. The control data is divided into a predetermined number of blocks, the discrimination code "d" is inserted between respective blocks to generate the data sequence, and the data length per unit block is set to most approximate to the value of square root of the control data length.

15 Claims, 10 Drawing Sheets

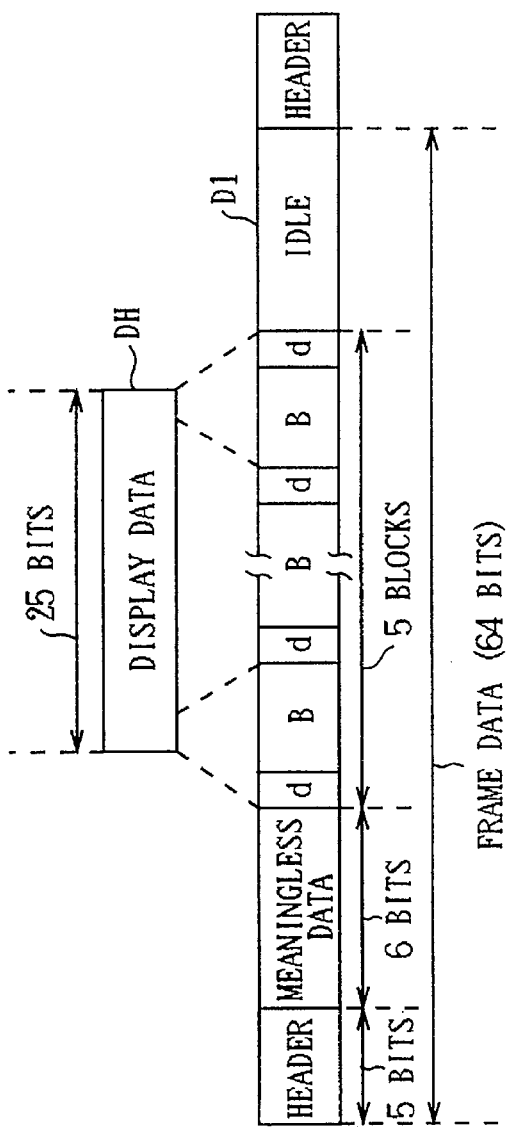
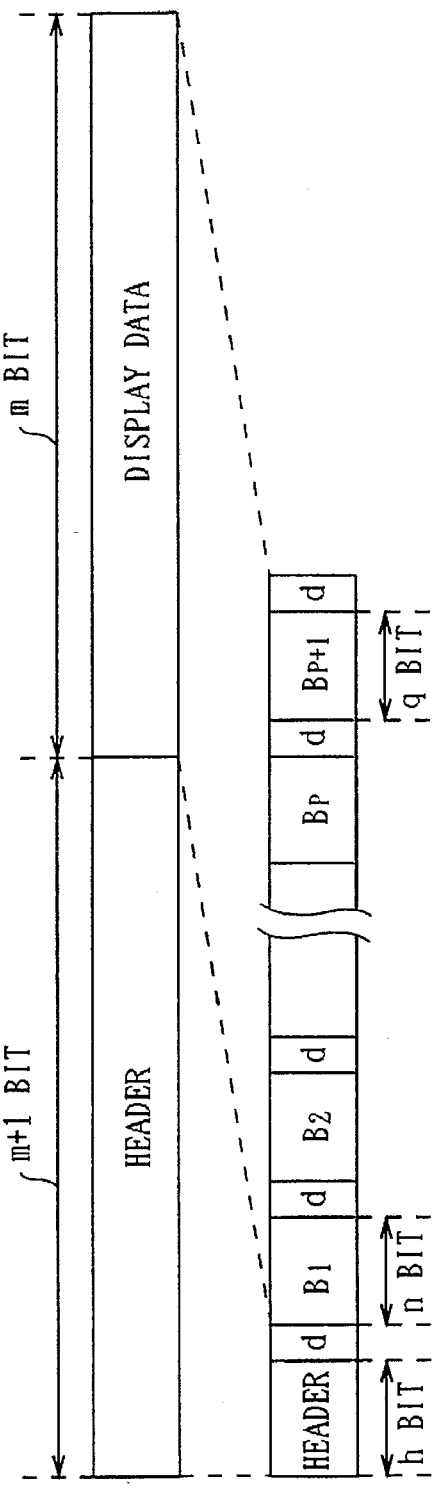
FIG. 7A
FIG. 7B
FIG. 8A
FIG. 8B

DATA TRANSMITTING AND RECEIVING METHOD AND APPARATUS THEREOF

BACKGROUND

1. Field of the Invention

The present invention relates to a data transmission apparatus and is suitably applied to a portable compact disc player which can be controlled by a wireless remote commander.

2. Background of the Invention

Heretofore, in the portable type compact disc player, there have been some miniaturized devices which can be driven by a battery.

More specifically, by miniaturizing the whole shape and driving the apparatus with a battery, this type of compact disc player can be easily portable and the user can appreciate music at the desired place.

Hereupon, in this type of compact disc player, if the compact disc player body and the control unit are formed separated and audio signal can be reproduced at the compact disc player body and simultaneously, the reproduced audio signal can be wireless transmitted to the control unit, the user can appreciate music in a state where the compact disc player body is put in a bag and the usability of this type of compact disc player can be improved.

If the wireless remote commander function would be operated in the control unit, the operation of a compact disc player body can be controlled in a state where the compact disc player body is put in a bag.

Furthermore, if a display unit is formed in this control unit and the operation of the compact disc player body can be confirmed through this display unit, the usability can be further improved.

Therefore, it is necessary that the compact disc player body wireless transmits audio signals and display data to the control unit, and also the control unit wireless transmits the control data for switching the operation to the compact disc player body.

In the portable compact disc player of this type, it is also necessary to downsize the shape of the control unit.

Furthermore, it is necessary for the control Unit to lower the operating voltage and to further decrease the consumption of the power source.

However, if the operating voltage is lowered, it becomes essential to decrease the operating speed in the control unit, and after all, it takes time for receiving process of the display data outputted from the compact disc player body.

On the other hand, it is necessary that in this control unit, the operation of the operation key is detected at a predetermined cycle, and depending upon the detected result thereof, the control data must be outputted to the compact disc player body.

Thus, if the operating voltage of the control unit is lowered, the key scanning cycle of the operation key becomes longer for the time required for receiving process of the display data, and accordingly the usability becomes worse.

Because of the above-mentioned problem, even if the operation key in the control units operated by the user, the responding speed of the compact disc player body deteriorates.

As one of the methods to solve the above problem, the method for performing the process of outputting the control data by key scanning in synchronism with the process of receiving the display data at two processing systems can be considered. However, if such a case would be done, construction of the control unit becomes complicated and also the consumption of power increases.

SUMMARY OF THE INVENTION

In view of foregoing, an object of this invention is to provide a data transmitting apparatus which is capable of transmitting control data, such as display data, effectively.

The foregoing objects and other objects of the invention have been achieved by the provision of a data transmitting apparatus, in transmission data is composed of m bits is serial transmitted from a transmitting device to a receiving device. The transmission data composed of m bits is divided into blocks of p-number (provided that, p=m/n when it is divisible, p={INT (m/n)}+1 when p=m/n is not divisible ("INT" is an integer which the figures below the decimal point is omitted)) with the integral value $n=INT(m^{1/2})$ (provided that, "INT" is an integer with the figures below the decimal point omitted or rounded up), a header composed of n+1 bits is added to the transmission data, a discrimination code composed of d bits ("d" is a positive integer) is added between the header and each p-number block, and the transmission data is converted into a conversion data composed of $n+1+d+(n+d)\times P$ (bits/frame) by a converter, and the conversion data is transmitted by a transmitting unit.

Furthermore, according to this invention, another object of the invention is to provide a data receiving apparatus, in which transmission data composed of m bits is divided into p-number blocks (provided that, p=m/n when it is divisible, p={INT (m/n)}+1 when p=m/n is not divisible (provided that, "INT" is an integer which the figures below the decimal point is omitted)) with the integral value $n=INT(m^{1/2})$ (provided that, "INT" is an integer which the figures below the decimal point is omitted or the figure below the decimal point is rounded up), a header composed of n+1 bits is added, a discrimination code composed of d bits ("d" is a positive integer) is added between the header and each p-number block, and the transmission data converted into a data composed of $n+1+d+(n+d)\times p$ (bits/frame). The transmitted data from the transmitting device is received by a receiving device, the receiving device including a decoder for detecting the transmitted data of 1 frame on the basis of the header and detecting the control data based on the discrimination code of the transmitted data to decode, respectively.

BRIEF DESCRIPTION OF THE DRAWINGS

The invention will be more readily understood with reference to the accompanying drawing, wherein:

FIGS. 7A and 7B are schematic diagrams showing display data and the composition of transmission data when the display data is transmitted;

FIGS. 8A and 8B are schematic diagrams showing data composition when header and the display data are successively transmitted, and data composition when the display data are divisionally transmitted, respectively;

DESCRIPTION OF THE INVENTION

Preferred embodiments of this invention will be described with reference to the accompanying drawings:

(1) Construction

Figures 1A, 1B:
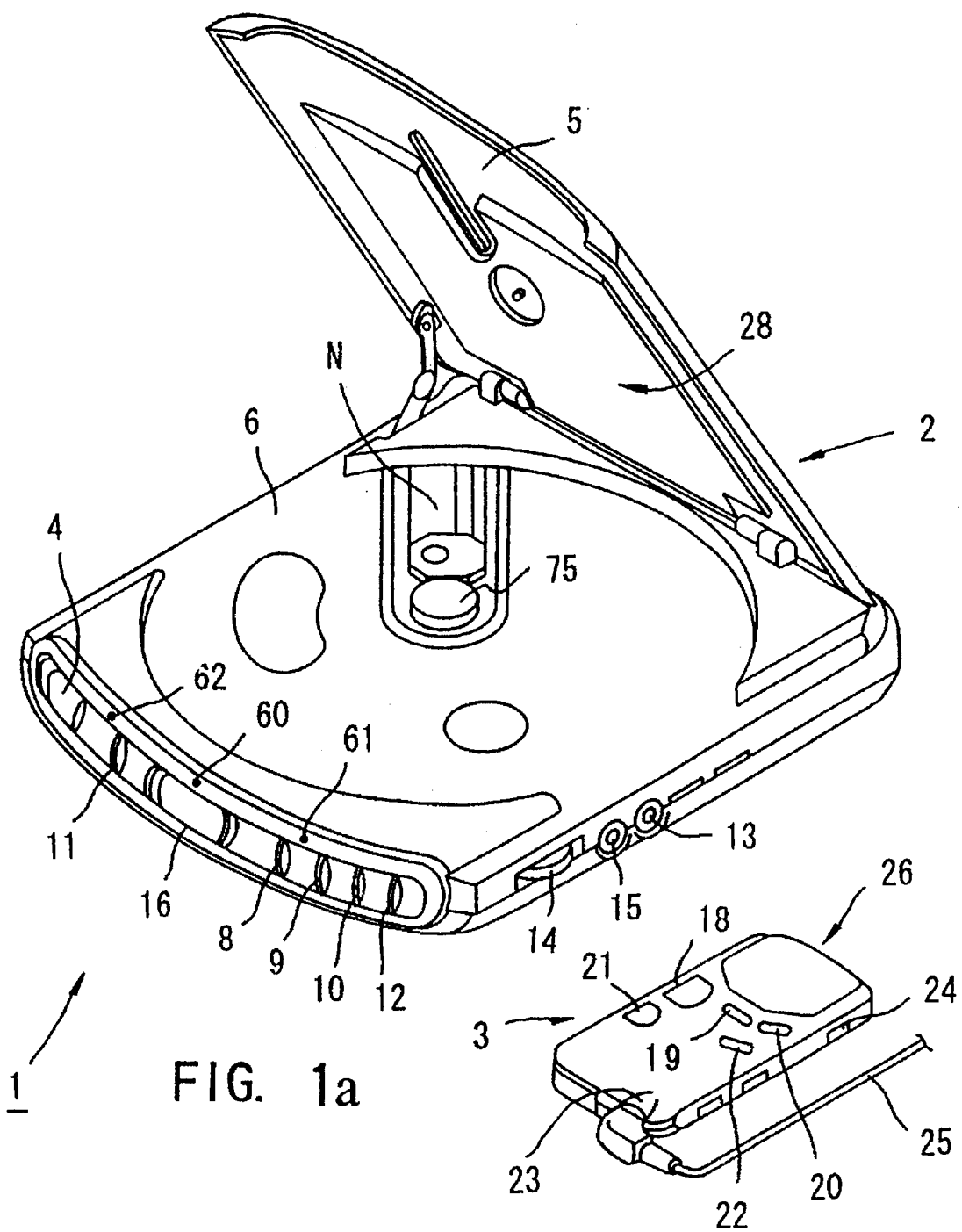
FIGS. 1a and 1b are perspective views showing a compact disc player and a wireless remote controller according to one embodiment of this invention.

In FIGS. 1a, and 1b generally shows a portable compact disc player, which is composed of a compact disc player body 2 for reproducing the compact disc and a remote commander 3 for remote controlling the compact disc player body 2.

Here, in the compact disc player body 2, a cover opening and closing operation key 4 is slid to open a cover 5, and the cover 5 is closed upon placing the compact disc on a chucking 75, so that the compact disc can be held in a reproducible condition.

Under this condition, the compact disc player body 2 is controlled by operating one of operation keys 8 to 16 placed in front.

And furthermore, an operation key 8 is pressed to start the reproducing function of the compact disc, and by pressing this operation key 8 again during reproducing function, the reproducing function can be paused temporarily.

Furthermore, in the compact disc player body 2, the operation key 9 adjacent to the operation key 8 is pressed to stop the reproducing function and to switch the power source to "off" condition.

Thus, the compact disc player body 2 can execute the desired reproducing processing and furthermore, can switch the power source to "off" condition by operating the operation key 9.

Furthermore, in the compact disc player body 2, after starting the reproducing function, the operation keys for skipping 10 and 12 placed in front are pressed, thereby it is able to skip the music in the course of reproduction per one tune in the reproducing direction or in the opposite direction to the reproducing direction. Moreover, the operation keys 10 and 12 are continuously pressed during a predetermined time, thereby reproduction speed becomes speeded up in the reproducing direction or in the opposite direction to reproducing direction, and the objective to be reproduced can be searched.

Furthermore, after starting the reproducing function, in the compact disc player body 2, an operation key of ESP (Electronic Shock Proof) mode 11 is operated, so that the function mode can be switched between the ESP mode and the normal mode.

In ESP mode, the rotary speed of the compact disc is made faster than the speed at the normal mode to store the reproducing signal in the memory, so that it is possible to reproduce successively even though track jump has occurred owing to vibration etc., during reproduction.

The compact disc player body 2 has an earphone jack 13, a volume adjusting operation key 14 and a line out Jack 15 on the side, and by operating operation keys 8 to 15 upon plugging an earphone plug in the earphone jack 13, it can be possible to listen to the compact disc in utilizing only the compact disc player body 2 without using the remote commander 3.

By sliding a hold switch 16 of the front to the left side repeatedly, the compact disc player body 2 can switch the condition to receive the remote control of the remote commander 3 (hereinafter referred to as "stand-by condition") and the condition not to receive the remote control.

Furthermore, in the compact disc player body 2, the hold switch 16 is slid to the right side to receive the remote control from the remote commander 3, and also the condition can be held, which does not receive the operation of operation keys 8 to 11 placed in the compact disc player body 2 (hereinafter referred to as "hold condition").

Thus, in the compact disc player body 2, it is capable of avoiding the erroneous operation of operation keys 8 to 15 at the time when the compact disc player body 2 is put in the bag for example by sliding the hold switch 16 to the right side.

In the remote commander 3, a reproducing operation key 18, skipping operation keys 19 and 20, a stop reproduction operation key 21 and the ESP mode switching operation key 22 are arranged corresponding to the operation keys of the compact disc player body 2, and the control data is outputted to the compact disc player body 2 corresponding to the operation of each operation key 18 to 22.

Thus, in the compact disc player 1, operation keys 18 to 24 are operated in the same manner as in the corresponding operation keys 8 to 14 of the compact disc player body 2, so that the function of the compact disc player body 2 can be switched.

Furthermore, an earphone jack 23 and a volume adjusting operation key 24 are placed on the side of the remote commander 3, and in a state where the compact disc player body 2 is set on the stand-by condition and the hold condition, the audio signal wireless transmitted from the compact disc player body 2 is outputted from the earphone jack 23.

After the earphone plug is inserted into this earphone jack 23 in place of the earphone jack 13 of the compact disc player body 2, the remote commander 3 switches the function mode of the compact disc player body 2, thereby audio signal reproduced at the compact disc player body 2 can be listened wireless.

In the conventional portable audio appliances which are capable of listening to the audio signal via the remote commander, a remote commander and an earphone cable are formed unitedly.

However, with this arrangement, in case of listening to the audio signal only with the main appliance, it is necessary to have another earphone and even in the case where only the earphone gets out of order, it is essential to repair it with the remote commander unitedly.

Figure 2:
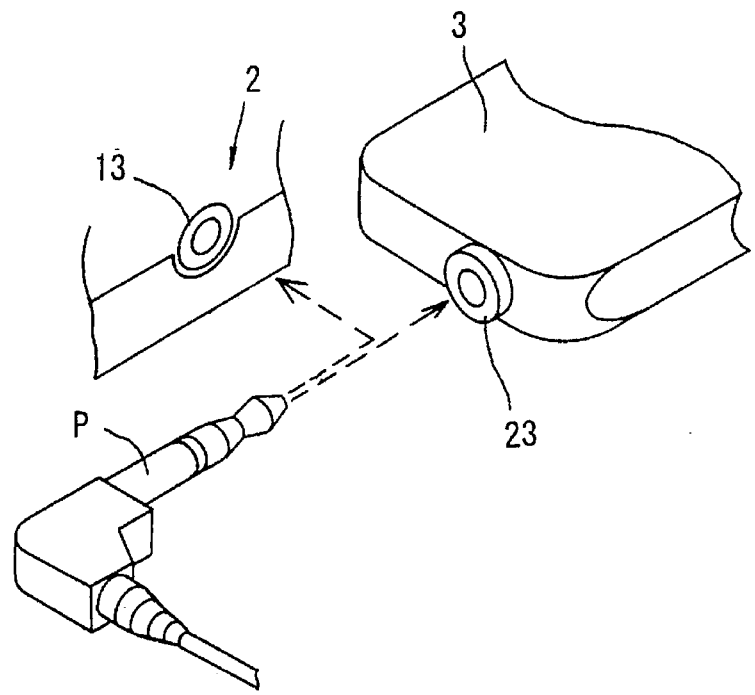
FIG. 2 is a perspective view showing connections for a headphone jack and a remote control.

On the contrary, as shown in FIG. 2, if the earphone jacks 13 and 23 are formed in the compact disc player body 2 and the remote commander 3 respectively, and an earphone plug P can be connected to either of the compact disc player body 2 or the remote commander 3 selectively according to the user's demand, the audio signal can be listened by connecting the earphone which the user desires without having another earphone, and furthermore, if the earphone breaks down, only the earphone must be replaced.

Accordingly, the usability of the compact disc player 1 can be further improved.

With this arrangement, in the compact disc player 1, the earphone Jacks 13 and 23 are arranged to be able to connect the earphone plug P which is a so-called mini plug used in the stereo type, so that the usability can be remarkably improved.

Thus, in the compact disc player 1, the function of the compact disc player body 2 is controlled by the remote commander 3 upon connecting the earphone plug to the remote commander 3 and the audio signal can be listened the compact disc player body 2 is in a bag.

At this point, the remote commander 3 can transmit and receive the desired data between the compact disc player body 2 and the remote commander 3, in utilizing an earphone cable 25 connected to the earphone jack 23 as an antenna, and also can receive audio signals outputted from the compact disc player body 2.

The compact disc player 1 can receive the audio signal etc. with compact and simple shape as a whole, and can transmit and receive the desirable data between the compact disc player body 2 and the remote commander 3 only when it is necessary to control operation of the compact disc player body 2 with the remote commander 3.

In the case where the earphone plug P is not connected to earphone jack 23 of the remote commander 3, it is judged that remote controlling of the compact disc player body 2 by the remote commander 3 is unnecessary. In this case, if data is transmitted and received between the compact disc player body 2 and the remote commander 3, it is considered that the compact disc player body 2 may be erroneously controlled.

Also, using the earphone cable as an antenna, if there is no need to remote control the compact disc player body 2 by the remote commander 3, the data outputted from the compact disc player body 2 cannot be received at the remote commander side and the power source or the remote commander 3 can be controlled, thereby the consumption of the power can be decreased according to the data received.

Furthermore, the remote commander 3 has a liquid crystal display unit 26 which displays the function modes of the compact disc player body 2, and so on.

Accordingly, in this compact disc player body 2, a base board storage space 28 is formed inside of the cover 5 which stores the transmitting and receiving base board.

Thus, the compact disc player body 2 receives the control data outputted from the remote commander 3 at this transmitting and receiving base board, and further outputs audio signal and display data of the liquid crystal display unit 26 to the remote commander 3.

At this point, when the operation keys 18 to 22 are operated, the remote commander 3 outputs the control data corresponding to this operation. On the other hand, the compact disc player body 2 continuously outputs the display data in a state of stand by and in a state of hold. Thereby, the function of the compact disc player body 2 can be monitored on the side of the remote commander 3.

Figure 3:
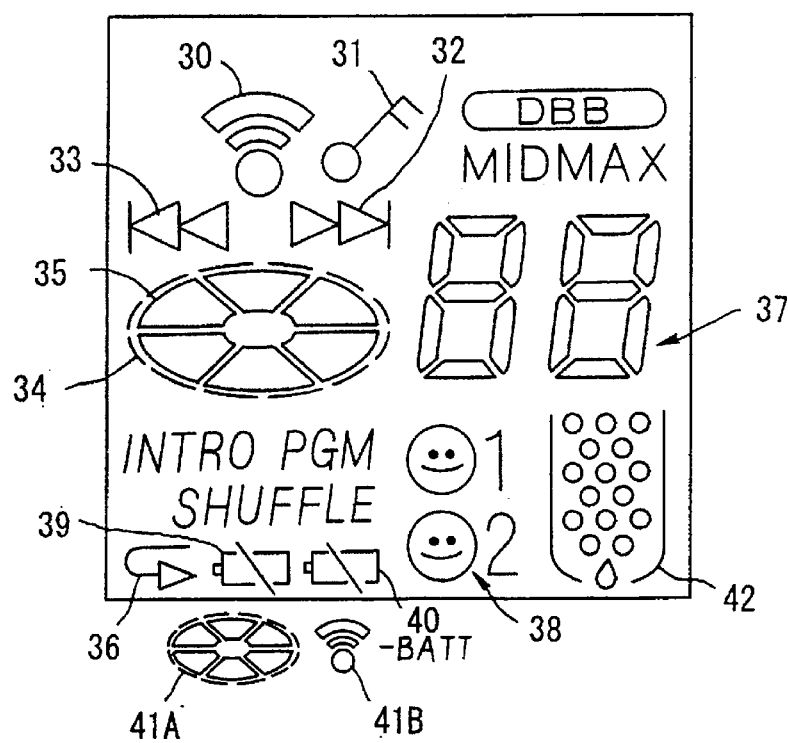
FIG. 3 is a plane view showing a liquid crystal display unit of the remote control.

Therefore, as shown in FIG. 3, when the remote commander 3 outputs the control data, it displays symbol 30 to show transmitting function of the control data and furthermore, switches the remaining displays of the liquid crystal display unit 26 according to the display data.

When the compact disc player body 2 is set in a state of hold by the operation of operation key 16, the remote commander 3 displays a key symbol 31. When the compact disc player body 2 starts the searching function or access function corresponding to the operation of operation keys 10, 11, 19 and 20, the remote commander 3 displays the symbol 32 or 33 to show searching or accessing.

Furthermore, the remote commander 3 displays an oval symbol 34 when the compact disc is held in a state of being loaded, and when the compact disc player body 2 starts the reproducing function, successively displays a fan-shaped symbol 35 formed imitating the compact disc inside of the symbol 34 in a circulating manner.

With this arrangement, at the time of reproduction, the remote commander 3 displays, corresponding to the movement of the compact disc, as the fan-shaped symbol 35 rotates, and at the search mode, the display switching of this symbol 35 is executed at a high speed and furthermore, the moving direction is switched according to the reproducing direction.

Furthermore, when the compact disc player body 2 is set to the introduction mode to reproduce the head of each program during predetermined period, the remote commander 3 displays "INTRO" display; when the compact disc player body 2 is set to the program mode to reproduce the number according to the preset order, the remote commander 3 displays "PGM" display.

Moreover, when the compact disc player body 2 is set to the shuffle mode to reproduce performances at random, the remote commander 3 displays "SHUFFLE" display, and displays an arrow symbol 36 when the compact disc player body 2 is set to the repeated mode to repeatedly a reproduce rendition.

Furthermore, in the case where the function mode to boost bass of reproduced audio signal is selected, the remote commander 3 displays "DBB" display and also displays "MID" or "MAX" display according to the level of emphasis, and also drives the display unit 37 of 2 digits 7 segments in order to show track numbers. Moreover, when the volume control mode to limit the sound level is selected, the remote commander 3 displays human faces symbol 38 and number "1" or "2" according to the controlling level.

Furthermore, if the power source of the compact disc player body 2 and the remote commander 3 decreases, the remote commander 3 displays symbols of warning 39 and 40 respectively.

According to this embodiment, in the case of remote controlling the compact disc player body 2 by the remote commander 3 and, simultaneously, wireless listening to audio signal reproduced at the compact disc player body 2, the power consumption of the remote commander 3 remarkably increases as compared with the case of only remote controlling the compact disc player body 2.

Thus, in the compact disc player 1, it is necessary to monitor the power consumption not only on the side of compact disc player body 2 but also on the remote commander 3 and to give warnings as occasion demands.

Accordingly, in this embodiment, the compact disc player body 2 supervises voltage of the power source of the compact disc player body 2 to monitor the consumption of battery stored in the compact disc player body 2, and judges thereby that the battery is used up when this power source voltage decreases under a fixed value.

Thus, when the compact disc player body 2 judges that the battery is exhausted, it outputs the judgment result in utilizing the display data to be outputted to the remote commander 3, and the remote commander 3 displays the display unit 39 based on the received result.

On the other hand, the remote commander 3 supervises the power source voltage to monitor the consumption of built-in battery, and if this power source voltage drops under the fixed value, displays the display unit 40.

Display units 39 and 40 have identical symbols and the power source of the compact disc player body 2 and the remote commander 3 can be distinguished by symbols 41A and 41B printed on the case of remote commander 3 and outside of the liquid crystal display unit 26 imitating the symbols of the compact disc 34 and the transmitting function 30.

In compact disc player 1, the user can easily confirm the consumption of the power source of the compact disc player body 2 and the remote commander 3.

On the other hand, when the compact disc player body 2 switches the function mode to the ESP mode, the audio data is reproduced via a memory of large capacity so that the continuous audio signal can be reproduced even if track jump occurs due to the vibration, etc.

At the time when an operation key 22 is operated, the remote commander 3 switches the compact disc player body 2 to the ESP mode and simultaneously displays the display unit 42 to display the data volume stored in this memory.

The compact disc player 1 can wireless operate the compact disc player body 2 and can monitor its operating condition, and furthermore, can receive wireless audio signal reproduced at the compact disc player body 2 using the remote commander 3.

Figure 4:
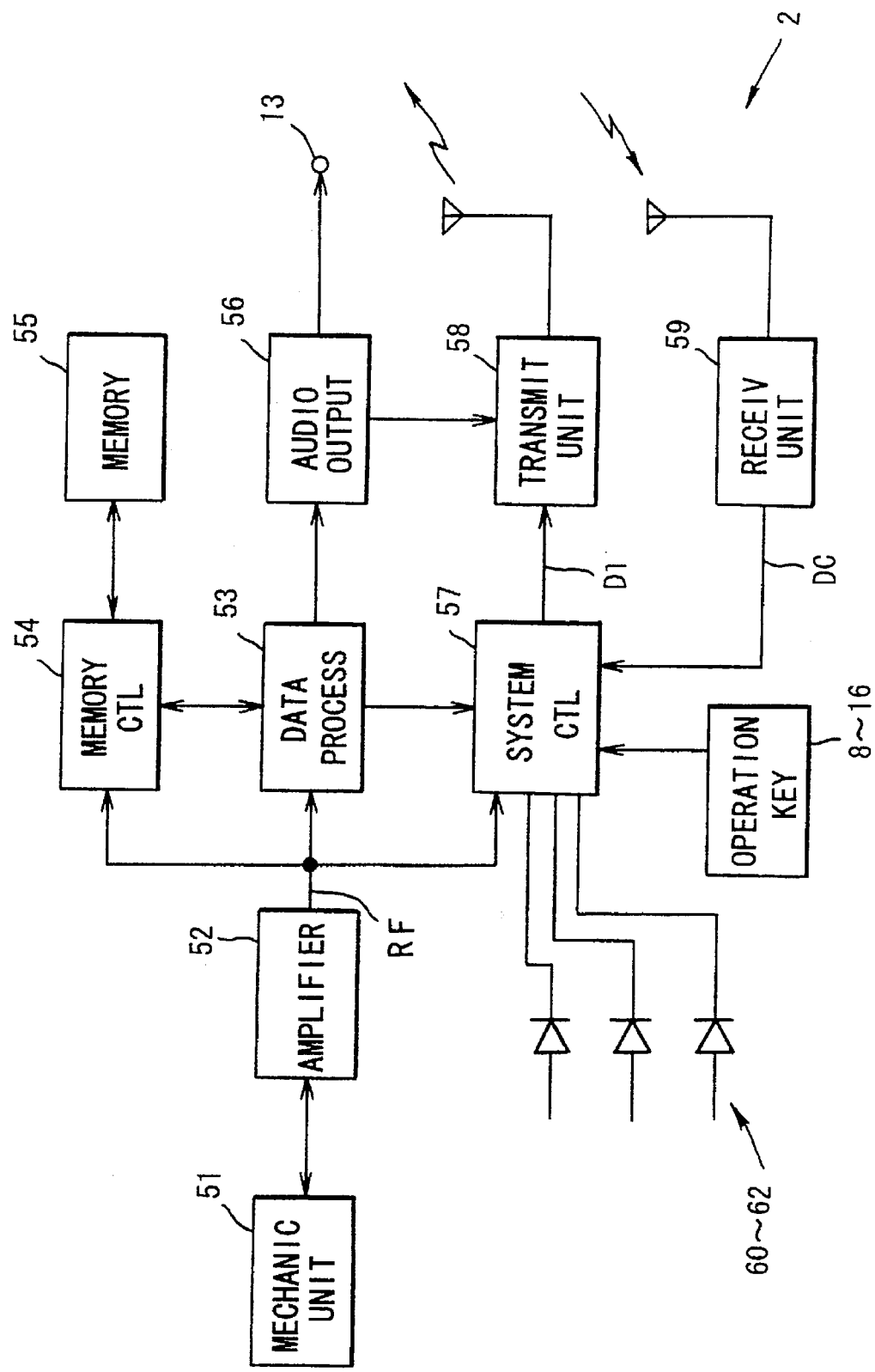
FIG. 4 is a block diagram showing the compact disc player body.

As shown in FIG. 4 and FIG. 1, the compact disc player body 2 drives a mechanical unit 51 based on the control code to be outputted from a system control circuit 57, thereby a spindle motor is driven to rotate the compact disc placed on the turntable 75 at a predetermined rotating speed.

Under this condition, the compact disc player body 2 irradiates optical beam of the optical pickup to the compact disc at the mechanic unit 51 and, simultaneously, receives its reflection beam at the optical pickup to output the light received result to an amplifier 52.

The compact disc player body 2 can detect tracking error signal and focus error signal via the amplifier 52 to control the mechanical unit 51 based on these signals for tracking control and focus control.

Furthermore, the amplifier 52 amplifies a reproduction signal RF composed of the reproducing result of the compact disc to convert into binary coding data, and thus, the compact disc player body 2 can detect audio data and address data added to this audio data etc., based on this binary coding data.

A data processing circuit 53 stores audio data to be successively inputted via a memory controller 54 in a memory 55 to error correction processing and de-interleave processing this audio data. Furthermore, the data processing circuit 53 inputs the audio data stored in the memory 55 and outputs to an audio output circuit 56. The audio output circuit 56 converts this audio data into analog signal at the built-in analog-to-digital conversion circuit.

Furthermore, the audio output circuit 56 amplifies this analog signal at the predetermined amplifier to output to the earphone jack 13. In this manner the audio signal recorded on the compact disc can be listened with the compact disc player body 2.

Accordingly, in the case of reproducing audio signal, when the ESP mode is set by operating the operation key 11 or depending upon the control data DC of the remote commander 3, the system control circuit 57 increases the rotating speed of the compact disc and simultaneously increases the processing speed of the data processing circuit 53. Therefore, the overall function is controlled in order that the transmission speed of audio data to be stored successively in the memory 55 becomes faster as compared with the transmission speed of audio data to be outputted from this memory 55.

Furthermore, the system control circuit 57 temporarily stops the reproducing function of the compact disc to set on the stand-by condition when over the fixed value of audio data is stored in the memory 55.

The compact disc player body 2 can successively output the audio signal under the condition on which more than the fixed value of reproduced audio data is constantly kept in the memory 55, so that the continuous audio signal can be outputted even if the abnormalities, such as track jump, have occurred.

When the audio data cannot continuously be reproduced correctly due to monitor tracking error signal, focus error signal and address data added to the audio data, the system control circuit 57 repeatedly reproduces the audio data which could not be reproduced correctly.

In the compact disc player body 2, since the data quantity of the memory 55 decreases in the case where outer disturbance, such as vibration, have occurred frequently, the data quantity stored in this memory 55 is displayed at the symbol 42 of the display unit 26 to get attention of the user.

Furthermore, the audio output circuit 56 outputs audio signal converted to analog signal to the transmitting unit 58, and here, the transmitting unit 58 modulates this audio signal with the carrier wave of frequency 239 [MHz] to output to the remote commander 3.

The compact disc player 1 receives this audio signal at the remote commander 3 to listen to the audio signal wireless.

On the other hand, in addition to the control of the memory 55, the system control circuit 57 issues the control code to each function block corresponding to the operation of operation keys 8 to 16, and based on the control data DC inputted via the receiving unit 59, thereby switches the function of the compact disc player body 2 to output the display data DH to the remote commander 3 via the transmitting unit 58.

At this point, the system control circuit 57 converts this display data DH to the prescribed format, after forming the display data DH, to generate the transmission data D1, and then the transmitting unit 58 outputs this transmission data D1 upon NRZ (Non Return to Zero) coding processing using the carrier of 44.1 [kHz]. Thus, the display data DH can be efficiently transmitted.

Furthermore, under the stand-by condition, the reproduction mode, and the ESP mode the, the system control circuit 57 lights up the corresponding light emitting diode 60 to 62, and thus, the operating condition can be confirmed on the compact disc player body 2 side.

Figure 5:
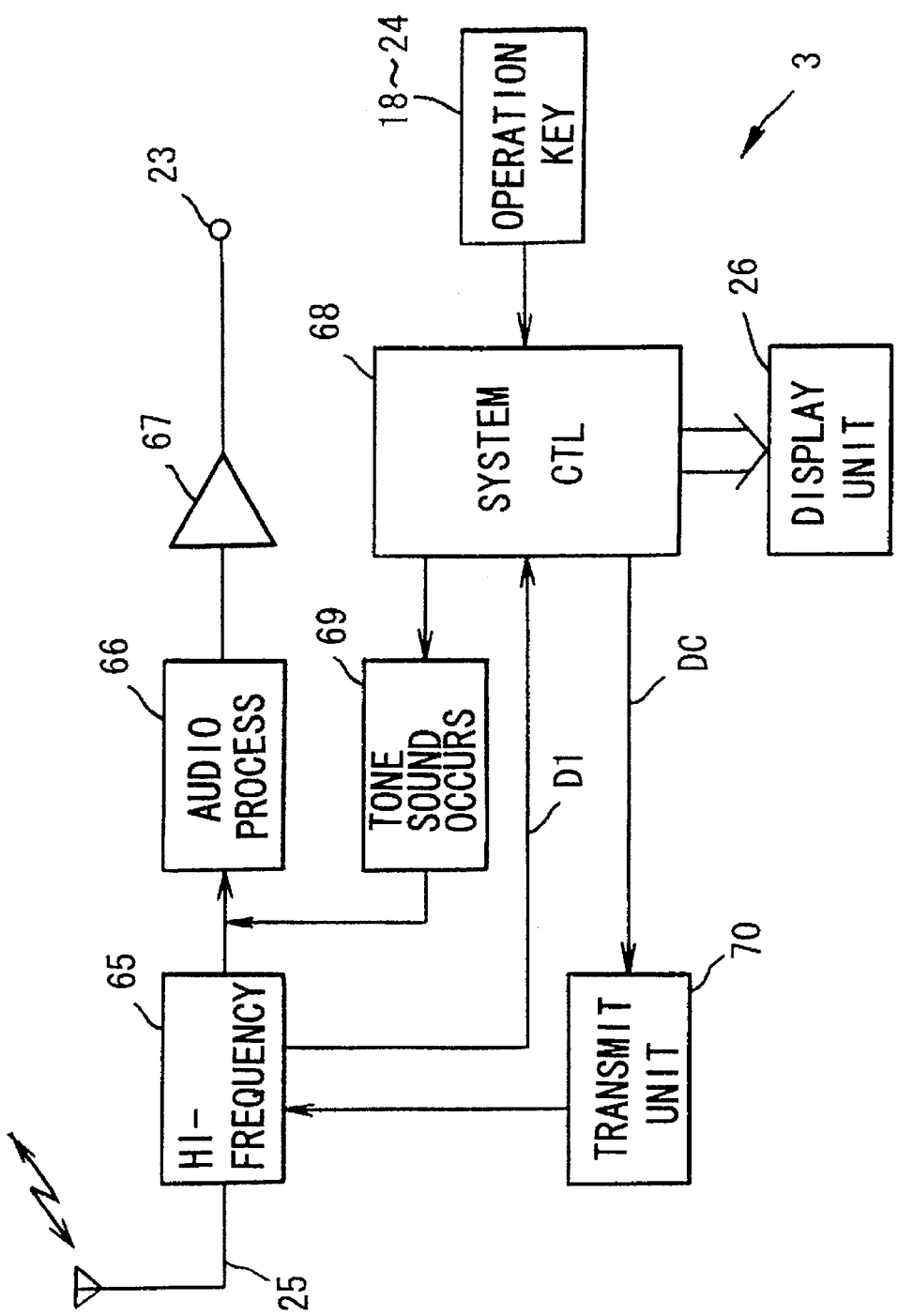
FIG. 5 is a block diagram showing a remote commander.

Corresponding to the above operation, as shown in FIG. 5, the remote commander 3 receives display data and audio signal outputted from the compact disc player body 2 at the earphone wire 25 which forms an antenna, and then outputs the received result to a high-frequency circuit 65.

Here, the high-frequency circuit 65 demodulates the audio signal to output to an audio processing circuit 66, and the audio processing circuit 66 executes sound volume control processing and bass emphasizing processing on this audio signal if necessary to output to the earphone jack 23 via the amplifier 67.

With this arrangement, the audio signal can be listened to with the desired operation mode via the remote commander 3.

Furthermore, the high-frequency circuit 65 receives the transmission data D1 outputted from the compact disc player body 2, and then outputs the received result to the system control circuit 68.

Thus, the system control circuit 68 detects the display data DH from the transmission data D1 to drive the liquid crystal display unit 26 depending upon the detected result, so that the function of the compact disc player body 2 can be confirmed.

Furthermore, the system control circuit 68 key scans operation keys 18 to 24 in the predetermined cycle to detect the operation of these operation keys 18 to 24, and drives the liquid crystal display unit 26 depending on the detected result and further on the display data DH and simultaneously, switches the function of the audio processing circuit 66.

Therefore, the compact disc player 1 is arranged to operate the operation key 24 to adjust sound volume, etc., and also display symbol 30 and others.

Furthermore, the system control circuit 68 detects the user's erroneous operation, based on the detected result of operation of the display data DH and operation keys 18 to 24, to drive a tone generation circuit 69 if necessary, so that the user's attention can be called forth.

Moreover, the system control circuit 68 generates control data DC based on the detected result of the operation of operation keys 18 to 24 to output to the transmitting unit 70.

Corresponding to the above operation, the transmitting unit 70, after NRZ coding processing this control data DC by the predetermined carrier wave, outputs this control data to an antenna 25 via the high-frequency circuit 65 and thus, this control data DC can be outputted to the compact disc player body 2.

Thus, the compact disc player 1 can remote control the compact disc player body 2 in utilizing the remote commander 3.

Figure 6:
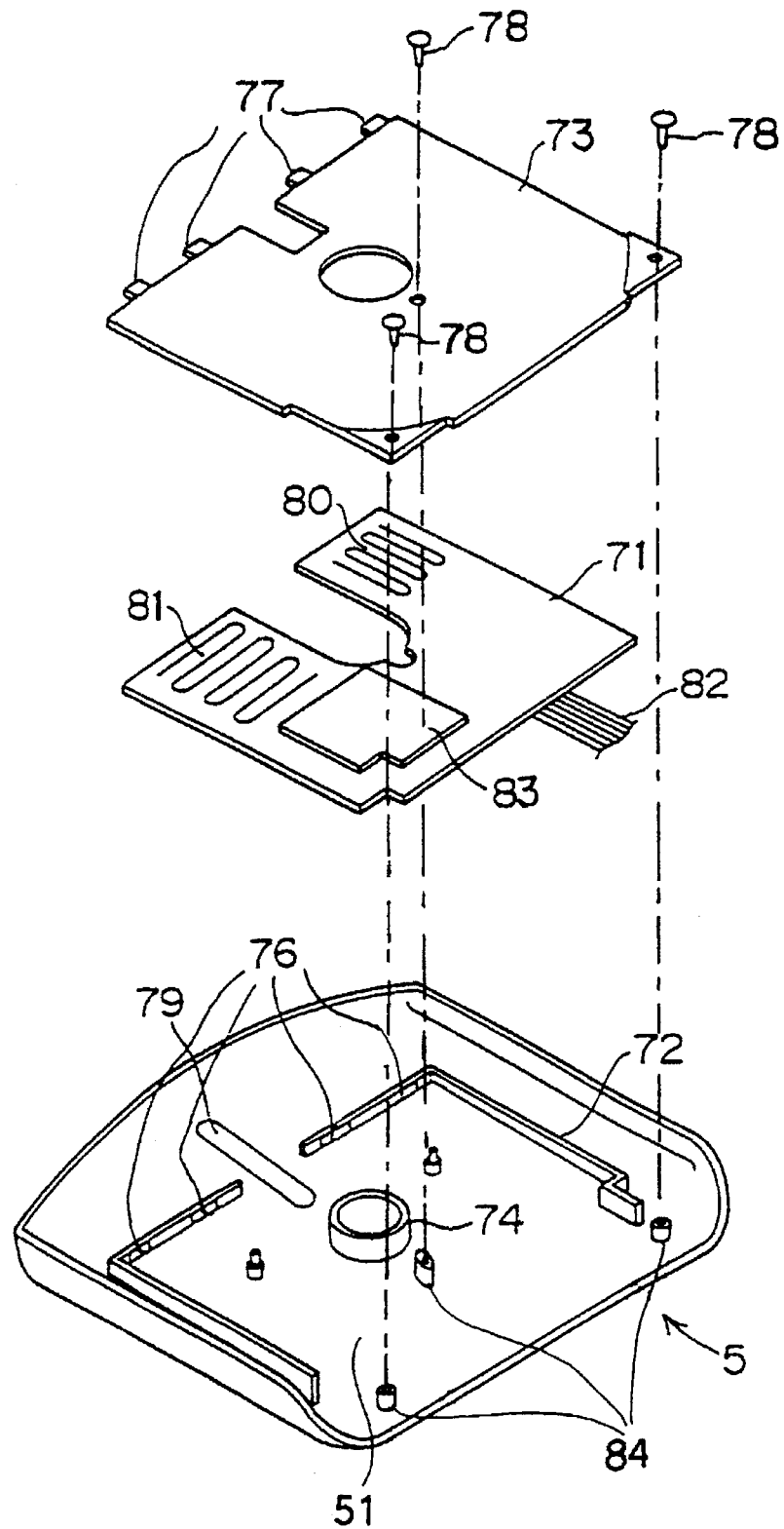
FIG. 6 is a mechanical drawing showing a transmitting and receiving unit provided on the lid of a compact disc player.

In the compact disc player body 2, as shown in FIG. 6, the transmitting unit 58 and the receiving unit 59 are formed incorporated with a transmitting and receiving base board 71 and the transmitting and receiving base board 71 all stored in a base board storing space 51.

The base board storing space 51 forms a rib 72 elongated as almost "U" shape inside of the lid 5, and the rib 72 is covered with a molded cover 73.

Furthermore, in the lid 5, a rib 74 which rises circularly is formed surrounding the center of rotation of the spindle motor. A circular perforation hole is formed at the center of the cover 73 corresponding to the rib 74.

With this arrangement, in the compact disc player body 2, the base board storing space 28 is allocated to avoid a chucking system 75 (shown in FIG. 1) for chucking the compact disc to the spindle motor.

With this arrangement, the lid 5 can be kept adjacent to the compact disc, so that the whole shape can be made thin.

Furthermore, in the lid 5, piercing holes 76 are formed in rectangular shape at the root of the rib 72. The projection units 77 having rectangular shape are arranged on the cover 73 corresponding to the piercing holes 76.

The transmitting and receiving base board 71 is fixed by inserting the projection units 77 into the piercing holes 76 and also screws 78 into the perforation holes formed on the cover 73, and screwing the cover 73 and the bosses 84 of the lid 5.

A window 79, which can confirm whether or not the compact disc is loaded, is arranged on the lid 5.

The transmitting and receiving base board 71 is double-sided and has a nick avoiding the center line of the base board.

Furthermore, two antennas 80 and 81 are formed, which have a zigzag wiring pattern. The interference of electric waves is eliminated by arranging the wiring direction of the antennas 80 and 81, which repeats zigzag, straight.

The antenna 80 receives the control data and the antenna 81 transmit the audio signal and display data.

Since the optical pickup for reproducing the compact disc loads the semiconductor laser and drives with high frequency, the transmitting and receiving signal may receive a bad influence. Therefore, the antennas 80 and 81 are allotted distant from the optical pickup.

Furthermore, a shielding board 83 is provided on the position of confronting with the optical pickup in order to prevent from the high-frequency noise from the optical pickup.

(2) Transmission of Display Data

Here, the display data is composed of the data necessary for driving the liquid crystal unit 26 of the remote commander 3 and the check-sum for error detection. The remote commander 3 can switch the display of the liquid crystal unit 26 by the display data, and simultaneously, can confirm the function of the compact disc player body 2, and also can switch the function of the audio processing circuit 66 and is able to retransmit the control data according to demands.

As shown in FIGS. 7A and 7B, this display data DH is formed of variable length data of maximum 25-bit (FIG. 7A), and the system control circuit 57, after dividing this display data DH into 5 blocks, inserts de-limiter bit "d" showing a dividing point between each block, and adds a header of 5 bits and meaningless data of 6 bits on top of this data sequence. Furthermore, the system control circuit 57 adds idle data at the end of this data sequence, so that one frame transmission data D1 is formed (FIG. 7B).

The idle data described above is for generating the time of receiving process, therefore it is meaningless.

The system control circuit 57 outputs this transmission data D1 to the remote commander 3 via the transmitting unit 58, and the remote commander 3 receives this transmission data D1 at the high frequency circuit 65 and outputs to the system control circuit 68. Thus, the display data DH can be detected at the system control circuit 68.

In the compact disc player 1, after inserting delimiter bit "d" upon dividing the display data DH into 5 blocks "B", 5-bits header and 6-bits meaningless data are added to this data sequence to generate a frame of transmission data D1, so that the display data DH can be efficiently transmitted and the load on the system control circuit 68 of the remote commander 3 side can be decreased.

The remote commander 3 can be driven by the 1.5 [V] power source so that the whole shape can be miniaturized and further can be made light weight.

In the system control circuit 68 of this remote commander 3, the clock frequency is selected to a low frequency such as 32 [kHz], and this causes a problem that the processing speed cannot be increased. The system control circuit 68 is arranged that its machine cycle is selected to 9 clock (91 [ηsec]).

Thus, in the compact disc player 1, it is necessary that the display data DH is efficiently transmitted to minimize the time required for receiving the display data and the usability can be improved by decreasing the load on the system control circuit 68.

In the case of serial transmitting the desired data repeatedly, it is necessary to add the header to show the divider between data repeating.

Furthermore, it is necessary to assign a preset bit pattern to this header so that the bit pattern of this header does not coincide with the bit pattern of transmitting data. Therefore, in case of continuously transmitting display data DH, for example, composed of m=25 bits, as shown in FIGS. 8A and 8B, 26 bits are needed as the bit length of the header, and after all, it is necessary to repeatedly output 51-bit data as a whole (FIG. 8A).

On the other hand, in case of dividing the display data into blocks and inserting delimiter bit "d" between each block to generate the data for transmission, one extra bit is selected corresponding to bit length of the each block so that divisions between data can be distinguished.

However, even in this case, when the display data is blocked per one bit for example, it becomes necessary to have 26 bits for delimiter bit "d" and 2 bits for the header, and after all, it is necessary to repeatedly output the data of 53 bits as a whole. On the other hand, if the display data is blocked per 2 bits, for example, it becomes necessary to have 13 bits for delimiter bit "d" and 3 bits for the header, and after all, it is necessary to output the data of 41 bits repeatedly as a whole.

Accordingly, in this embodiment, the system control circuit 57 selects the block number in order that the time required for receiving process of this display data DH becomes the shortest, and the display data DH is divided into blocks with this selected block number to generate the transmission data D1.

More specifically, in the case where the display data set as m-bit is blocked per n-bit (FIG. 8B), placing the remainder q-bit of the above which cannot be divided at the end of data sequence, the following equation:

$$m = n \times p + q \quad (0 \leq q < n) \tag{1}$$

can be obtained. In this case, it turns out that the whole is divided into p+1 blocks "B".

At this point, it is necessary to select the bit length of header "h" to the length of the following equation:

$$h = n + 1 \tag{2}$$

provided that, 1-bit delimiter bit "d" is inserted between each block "B", as shown in FIG. 8B, a frame of data length "f" can be expressed as following equation:

$$\begin{aligned} f &= h + 1 + (n+1) \times p + (q+1) \\ &= (n+1) + 1 + (n+1) \times p + (q+1) \end{aligned} \tag{3}$$

Here, in accordance with the relationship of equation (1), the following equation:

$$p = (m-q)/n \tag{4}$$

can be obtained, and if substituting the above into equation (3), the following equation:

$$f = n + (m-q)/n + m + 3 \tag{5}$$

can be obtained.

Accordingly, if equation (5) is differentiated by "n" and the value of "n" which sets "f" to the minimum value is detected, the following equation:

$$n = (m-q)^{1/2} \tag{6}$$

can be obtained, and if equation (6) is substituted into equation (5), a frame of data length fmin can be shown as following equation:

$$fmin = m + 3 + 2 \times (m-q)^{1/2} \tag{7}$$

More specifically, as this embodiment, in case of blocking the display data DH to insert the delimiter bit "d" between each block and transmitting upon adding the header, if the bit length "n" of each block is selected to the most approximate value to the square root of this data length "m", it is apparent that the bit length "f" of the transmission data Di becomes the shortest.

There are two ways to make the square root of M an integer, namely, the figures below the decimal point can be omitted or rounded up. In this case, both of them can be selected.

In this connection, in the case of selecting to n=1 in utilizing equation (5) (i.e., in the case of applying the most inefficient transmitting method), if the overall bit length fmax is detected, it can be expressed as following equation:

$$fmax = m + 4 + m - q \tag{8}$$

where, q=0, by subtracting equation (7) from equation (8) and it is apparent that the data of m-bit can be transmitted with the lesser bit number that can be expressed in the following equation:

$$fmax - fmin = m + 1 - 2m^{1/2} \tag{9}$$

In the case of transmitting the data of 100 bits, for example, it becomes necessary to have 202 bits as the transmission data applying the Manchester code. However, if the transmission data is formed upon being divided into 10, the transmission data can be formed with 123 bits upon processing NRZ coding, so that the time required for transmitting process and receiving process of the data transmitted can be shortened.

The work load of the whole system can be decreased and the key scan processing and the processing of control data, etc., can be performed in accordance with the real time.

According to this embodiment, the system control circuit 57 selects the data length of each block "B" to 5 bits obtained by substituting 25 bits into equation (6), so that it can be possible to efficiently transmit the display data DH.

Furthermore, according to this embodiment, the system control circuit 57 selects the data sequence of each block "B" in order that the bit pattern of header may not coincide with the bit pattern of each block "B", and thus, assigns 5 bits as the header to detect header certainly and the data length of the header can be accordingly shortened.

In practice, in case of serial transmitting this type of data, it requires the longest time for detecting the header. If the length of the header can be shortened and the header can be certainly detected, the time required for receiving process of this type of data can be shortened.

Furthermore, in this embodiment, the system control circuit 57 inserts meaningless data between the header and delimiter "d", and adds staff bit at the end of thus formed data, thereby a frame of the data length is set to 64 bits.

The system control circuit 57 transmits the transmission data D1 upon setting to the fixed bit length, and the processing of the remote commander 3 side can be simplified. Furthermore, key scanning processing can be executed in utilizing a period during which the meaningless data is received at the remote commander 3, and thus, the usability can be improved.

Furthermore, if the data of predetermined length can be transmitted in a short period of time, frequency to be used for transmitting each data can be decreased, and the mutual interference between the audio signals to be transmitted at the same time can be decreased.

With this arrangement, the system control circuit 68 on the remote commander 3 side detects the header from the transmission data D1 outputted from the high frequency circuit 65, and based on the timing of this header, detects the delimiter bit "d" to demodulate the former display data DH on the basis of this delimiter bit "d". Then the system control circuit 68 on the remote commander 3 side drives the liquid crystal display unit 26 and the audio processing circuit 66 depending upon this demodulated display data DH to output the control data as occasion demands.

(3) Processing of Display Data

In the case of performing the process of issuing the control data by key scanning and the processing of display data DH in the system control circuit 68 on the remote commander 3 side, it is considered to successively proceed these two processings with a time series.

Furthermore, in case of processing the display data DH, in order to effectively avoid the erroneous function, it can be considered that the display data is continuously received twice and the agreement or disagreement between these two display data DH are detected to process the correct display data.

Figure 9:
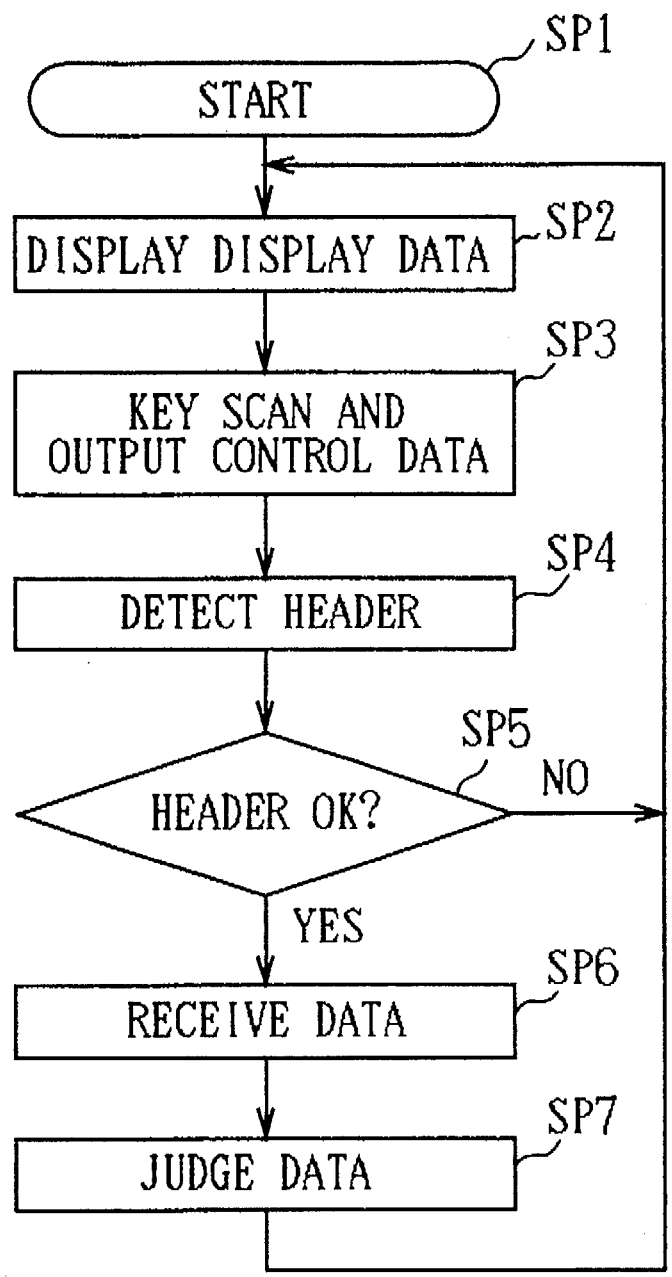
FIG. 9 is a flow chart explaining the receiving process thereof.

As shown in FIG. 9, the system control circuit proceeds from step SP1 to step SP2 to drive the liquid crystal display unit 26 according to the display data DH (in this case the liquid crystal display unit 26 is driven in accordance with the initial data since no display data DH is received at first), and then proceeds to step SP3 where key scan processing is executed to detect the operation of operation keys 18 to 24.

Furthermore, the system control circuit judges whether or not one of the operation keys 18 to 24 is operated, and at this point, if an affirmative result is obtained, outputs the control data corresponding to the operation of operation key, and then proceeds to step SP4.

On the other hand, if no operation key is operated, the system control circuit directly proceeds to step SP4 to detect the header from the received transmission data.

Since it can be considered that the user carrying a remote commander 3 moves out beyond the receivable range, the system control circuit proceeds to step SP5 after the predetermined period elapsed, to judge whether or not the header can be detected, and if a negative result is obtained here, returns to step SP2.

On the other hand, if the header can be detected correctly, the system control circuit proceeds to step SP6 to receive the transmission data twice, and then, at the next step SP7, detects the agreement or disagreement of these two receiving results to demodulate the display data DH, and then returns to step SP2.

With this arrangement, the system control circuit performs key scanning to execute the process for outputting the control data and the process for receiving the display data with a time series, thereby can control the overall operation.

However, in the case of this embodiment, since the clock frequency is selected to 32 [kHz] and the machine cycle is selected to about 1 [msec], the processing speed is slow.

More specifically, in case of processing 64-bit serial data by adapting this clock frequency, it takes about 200 [msec] to receive one field of data twice, and if the period to detect the header is added up, after all, it is capable of key scanning only 3 or 4 times during one second.

Under the above conditions, there are cases where the operation of the compact disc player body 2 cannot be switched corresponding to the operation of operation keys in spite of the fact that the operation key is operated, so that the usability of the compact disc player 1 is remarkably decreased.

On the contrary, in the case where the header cannot be detected due to the noise effect, the key scanning is repeated without executing processing procedure from steps SP6 to SP7, therefore the responding speed of the compact disc player body 2 is increased with respect to the operation of operation keys.

Therefore, in this embodiment, the system control circuit 57 of the compact disc player body 2 inserts 6 bits of dummy data which has no meaning at all between the header and the delimiter bit "d" to detect the header at the remote commander 3 side, so that it is able to execute the different processing from the receiving process of the display data during a period till receiving practically meaning data. Said practically meaning data is composed of data of block "B".

Figure 10:
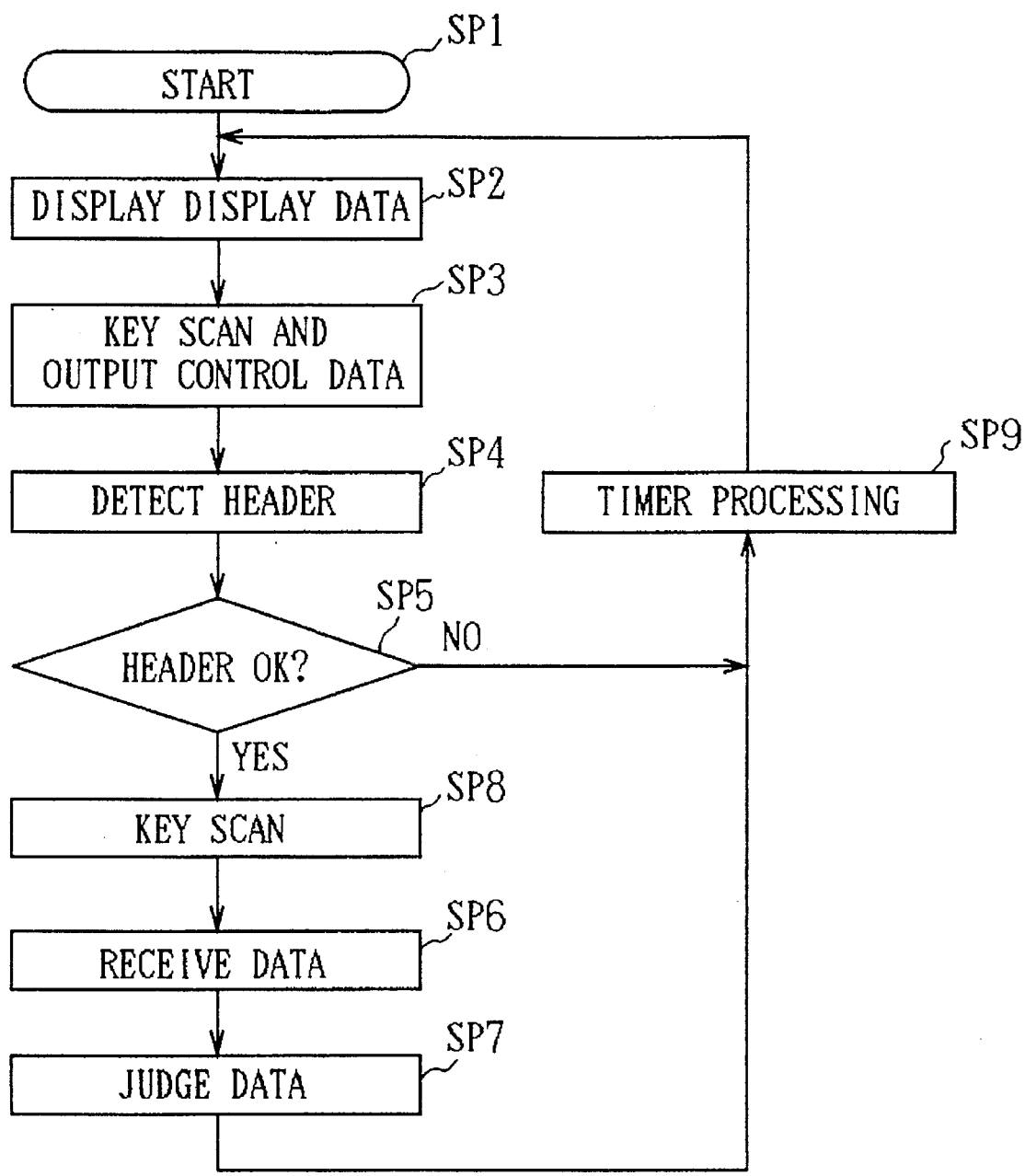
FIG. 10 is a flow chart showing the practical process thereof.

The system control circuit 68 on the remote commander 3 side, as shown in FIG. 10 in which corresponding parts of FIG. 9 are given the same reference numerals, detects the header, and then performs again at step SP8 the same key scan processing as process at step SP3 during a period till receiving the data.

Thus, in the compact disc player 1, the frequency of key scanning can be increased double compared with the case of performing the key scanning process and receiving process of the display data in time series, so that the responsiveness of the compact disc player 1 to the operation of operation keys can be improved and accordingly the usability of the compact disc player 1 can be improved.

As described above, since dummy data is inserted, parallel processing as shown in FIG. 10 can be performed during processing dummy data.

(4) Cancellation of Searching Function

In the compact disc player 1, if the operation key 19 or 20 of the remote commander 3 is continuously pressed, the performance for reproduction can be search retrieved (cue or review operation) during a period in which the operation key is pressed.

In the system control circuit 68, while the operation key 19 or 20 is pressed, an affirmative result is obtained at step SP3 as shown in FIG. 9, therefore the control data DC is outputted every time the processing procedure is sequentially repeated in a circulating manner.

In this case, the system control circuit 68 repeatedly outputs the control data DC showing that the operation key 19 or 20 is pressed, thereby outputs the same control data DC many times while the pressing operation is continued.

If the process of repeatedly outputting the same control data DC can be simplified, it is considered that the work load of the system control circuit 68 having slow function speed can be accordingly decreased.

Therefore, in this embodiment, if the operation key 19 or 20 is pressed continuously over the predetermined period of time, the system control circuit 68 outputs the control data DC at the timing of pressing starts and pressing ends.

With this arrangement, the operation of the compact disc player body 2 can be switched without continuously outputting the control data.

Figure 11:
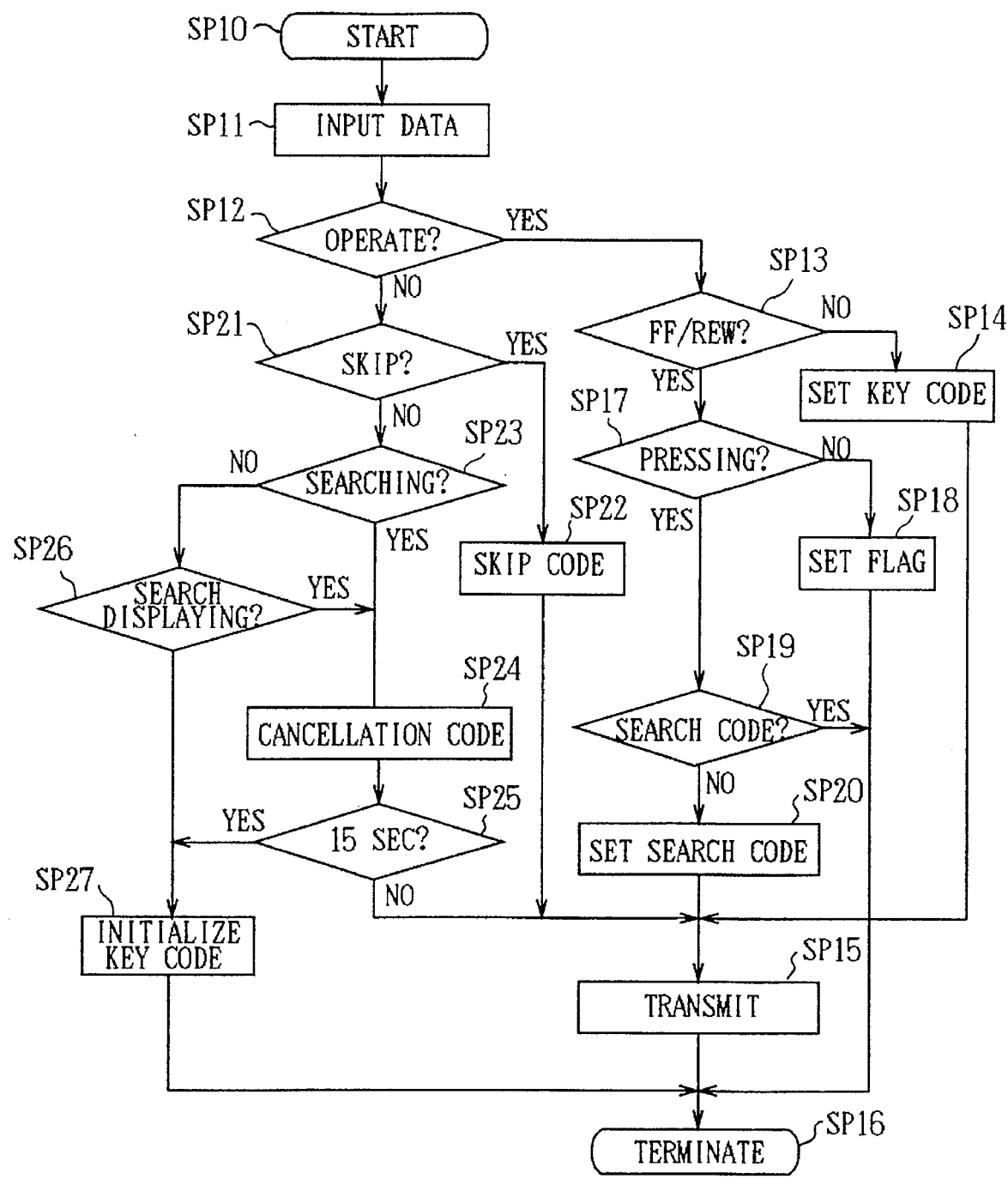
FIG. 11 is a flow chart explaining the output of key scan and control data.

More specifically, as shown in FIG. 11, the system control circuit 68 proceeds from step SP10 to step SP11 in the key scan and outputting process of control data (FIG. 10), and detects the logical level on the output port of key matrix circuit to input the key matrix data, and then proceeds to step SP12.

The system control circuit 68 judges whether or not either one of operation keys is pressed, and if an affirmative result is obtained, proceeds to step SP12 to judge that the operation key pressed is either the search operation key 19 or 20.

In the case where the operation key other than search operation keys 19 and 20 is pressed, a negative result is obtained, and the system control circuit 68 proceeds to step SP14 to set the key code corresponding to the operation key pressed.

Furthermore, the system control circuit 68 outputs this key code to the transmitting unit 58 at the next step SP15 to transmit the control data composed of this key code to the compact disc player body 2, and terminates the processing procedure at the next step SP16.

The remote commander 3 switches the operation based on this control data DC at the compact disc player body 2 and thereby can remote control the compact disc player body 2.

On the other hand, in the case where the searching operation key 19 or 20 is pressed, when an affirmative result is obtained at step SP13, and the system control circuit 68 proceeds to step SP17 to judge whether or not the case is press operated continuously.

When a series of procedure SP1→SP2→SP3→SP4→SP5→SP9 or a series of procedure SP1→SP2→SP3→SP4→SP5→SP8→SP6→SP7→SP9 described above regarding FIG. 10 are repeated in a circulating manner, the successive two key matrix data are inputted sequentially at step SP3, in case of performing the processing of step SP3, or the successive two matrix data are inputted sequentially at steps SP3 and SP8 in case of performing the processing of steps SP3 and SP8 sequentially, and the agreement or disagreement between these successive two key matrix data inputted at step SP3 or steps SP3 and SP8 is detected. Therefore, the judgment can be done.

At this point, in the case where two key matrix data do not agree (this means that the searching operation key 19 or 20 has not been pressed until immediately before this processing step is performed and at the timing of step SP11, the operation key 19 or 20 is pressed), the system control circuit 68 judges that it is not continuous operation of the operation key and proceeds to step SP18 to make the operation key 19 or 20 pressed and therefore set a flag showing that it cannot be Judged whether or not the operation is continuous pressing operation, and then proceeds to step SP16 to terminate the processing procedure.

On the other hand, in the case where the operation key is continuously pressed, an affirmative result is obtained at step SP17, and the system control circuit 68 proceeds to step SP19 to judge whether or not the key code is already set to the search code to show search mode.

Here, since a negative result is obtained immediately after the user starts continuous operation of the operation key 19 or 20, the system control circuit 68 proceeds to step SP20 to set key code to the search code showing the search mode corresponding to the pressed operation key 19 or 20, and proceeds to step SP15.

Thus, the system control circuit 68 outputs the control data DC which shows that the continuous pressing operation of the operation key 19 or 20 is started to the compact disc player body 2, and the compact disc player body 2 switches the operation corresponding to this control data DC to switch the function mode to the search mode.

On the other hand, since an affirmative result is obtained in the case where the operation key 19 or 20 is continuously pressed, the system control circuit 68 directly proceeds to step SP16 to terminate these processing steps.

With this arrangement, immediately after the continuous operation of the operation key 19 or 20 is started, the remote commander 3 outputs the control data DC showing that the continuous pressing operation has been started, and then stops outputting of the control data DC.

Accordingly, in the system control circuit 68, since it is not necessary to continuously output the control data, the work load can be decreased, e.g., the pressing operation of the operation key 19 or 20 is canceled, so that the function of the compact disc player body 2 can be quickly switched.

Also, since it is not necessary to continuously output the control data, even if the compact disc player body 2 becomes incapable of receiving the control data (e.g., in the case where the strength of a magnetic field momentarily decreases because such as a human being walks across between the compact disc player body 2 and the remote commander 3), the compact disc player body 2 can be held on the search mode, so that the usability of the compact disc player 1 can be accordingly improved.

On the other hand, in the case where no operation key is operated, or the pressing operation of the operation key 19 or 20 which has been operated till then is canceled, a negative result is obtained at step SP12, and the system control circuit 68 proceeds to step SP21.

Here, the system control circuit 68 detects the agreement or disagreement between two key matrix data continuously inputted in the same manner as step SP17, thereby judges whether or not the pressing operation of the operation key 19 or 20 which has been operated until then is canceled.

Furthermore, if the system control circuit 68 judges that the pressing operation of the operation key 19 or 20 is canceled, the system control circuit 68 judges whether or not the flag described in step SP18 is set.

In the case where the operation key 19 or 20 is pressed and pressing operation of the operation key 19 or 20 is canceled in the state where it cannot be judged that whether or not the flag showing the pressing operation is still continued is set, it can be judged that the operation key 19 or 20 is momentarily pressed.

The system control circuit 68 judges whether or not the user has executed the skip operation, and if an affirmative result is obtained here, proceeds to step SP22 to set the key code to the skipping key code corresponding to the operation key 19 or 20 press operated, and then proceeds to step SP15.

In the compact disc player body 2, the compact disc player 1 switches the function corresponding to this key code, the operation keys 19 and 20 being operated, so that the tune under reproduction is skipped.

Transmitting the control data DC, the system control circuit 68 resets the flag set accordingly.

On the other hand, in the case where the operation of operation key 19 or 20 which has been continuously pressed is canceled and furthermore, none of operation keys 18 to 24 is operated, a negative result is obtained at step SP21, so that the system control circuit 68 proceeds to step SP23 to judge whether or not the key code has been held on the search code.

In the case where the operation key 19 or 20 is continuously pressed, the system control circuit 68 executes the processing procedure of steps SP11→SP12→SP13→SP17→SP19→SP20→SP15→SP16 to output the search code, and executes the processing procedure of steps SP11→SP12→SP13→SP17→SP19→SP16 during a period in which the press operation is continued, and thus the key code is held on search code as it is.

The system control circuit 68 judges whether or not the present operation mode is search mode, and if an affirmative result is obtained, proceeds to step SP24 to set the key code to the cancellation code showing the cancellation of search mode. And then after pressing operation of the operation key 19 or 20 is canceled, the system control circuit 68 proceeds to step SP26 to judge whether or not more than 15 seconds passed, and if a negative result is obtained in this case, proceeds to step SP15 to output the key code of cancellation to the compact disc player body 2.

Since the compact disc player body 2 switches the function corresponding to this key code of cancellation, the compact disc player 1 can cancel the search mode of the compact disc player 1.

On the other hand, in the case where a negative result is obtained at step SP23, the system control circuit 68 proceeds to step SP26 to judge whether or not the function mode of the compact disc player body 2 is held still on the search mode.

More specifically, in this type of remote control, the control data cannot be received on the receiving side in spite that the data is outputted, and there are cases where the function mode cannot be switched after all.

Since the compact disc player body 2 side does not switch the function such as in the control data of start function to begin the search mode, so that the user operates it again. Thereby the function of the compact disc player body 2 can be switched and practically it does not matter if it is neglected.

However, in the case where the control data for canceling the operation cannot be received like this embodiment, the searching operation is repeated if left as it is, and after all, the power source of the compact disc player body 2 is wasted.

However, the remote commander 3 can detect the operation of the compact disc player body 2 based on the display data outputted from the compact disc player body 2, and can detect that the search operation is continued.

The system control circuit 68 detects the operation mode of the compact disc player body 2 in utilizing the display data DH, and if it is held on search mode, outputs the key code of cancellation.

The system control circuit 68 judges whether or not symbols 32 and 33 showing the search mode is displayed on the liquid crystal display unit 26, thereby judges whether or not the cancellation of search mode of the compact disc player body 2 has not been received, and if cancellation of function mode is received here, proceeds to step SP27 to set the key code to an initial value, and then proceeds to step SP16.

In the case where the compact disc player body 2 is held on stop or reproduction function mode, the system control circuit 68 performs this processing procedure as well as in the case where no operation key is operated.

On the other hand, if an affirmative result is obtained at step SP26, the system control circuit 68 proceeds to step SP23 to set the key code to cancellation again, and then proceeds to step SP25. Thereby, the system control circuit 68 issues the control code of cancellation continuously until the search mode of the compact disc player body 2 is canceled.

However, in the case where the user having the remote commander 3 moves to the place far from the compact disc player body 2, if the system control circuit 68 continuously issues the control code of cancellation, the search function of the compact disc player 1 cannot be canceled after all.

In this case, if the control code of cancellation is repeatedly issued, this control code cannot be received after all in the remote commander 3, so that the remote commander 3 wastes the power source.

Also, if the user forces to cut off the power source of the compact disc player body 2, the same condition may occur.

According to this embodiment, the system control circuit 68 performs the processing of step SP5 or step SP7 (FIG. 10), and then proceeds to step SP9 to execute the timer process at this point, thereby counts the time after pressing operation of the operation key 19 or 20 is canceled. Based on this timer processing, the system control circuit 68 judges at step SP25 whether or not more than 15 seconds have passed after pressing operation of the operation key 19 or 20 is canceled. If a negative result is obtained, the system control circuit 68 proceeds to step SP15 to issue the control code. On the other hand, if an affirmative result is obtained, the system control circuit 68 proceeds to step SP27.

Thereby, the system control circuit 68 can effectively avoid the wasteful consumption of power source of the remote commander 3.

Figure 12:
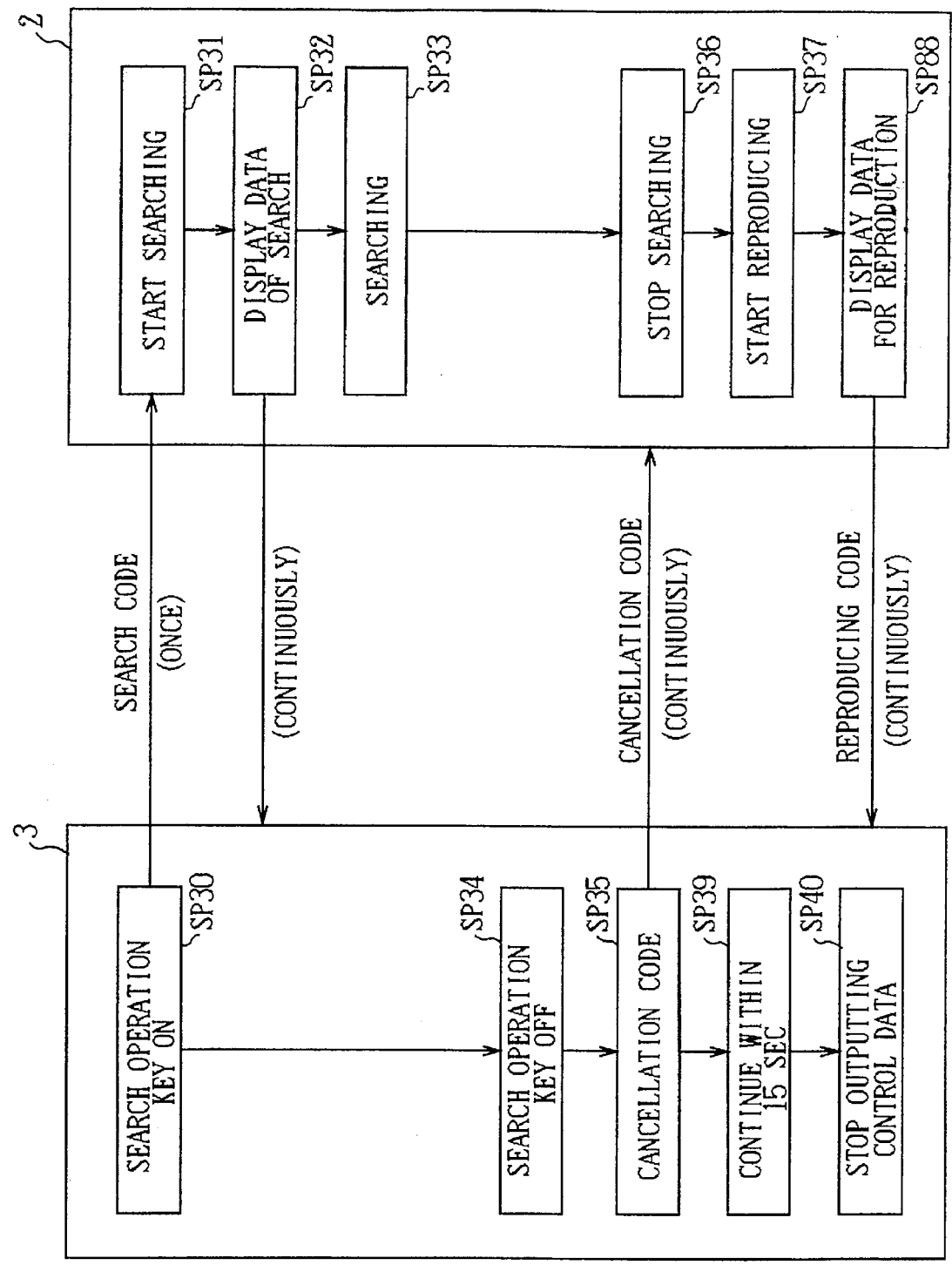
FIG. 12 is a schematic diagram explaining functions of a compact disc player body and a remote commander.

Thus, as shown in FIG. 12, a series of functions are summarized as follows; when continuous pressing operations of search operation keys 19 and 20 are started at step SP30, the remote commander 3 outputs the control data of search code once at first; corresponding to this the compact disc player body 2 is switched to search mode at step SP31.

Then, the compact disc player body 2 switches display data DH to be continuously outputted to the display data DH showing search mode at step SP32 (i.e., the display data displaying the symbol 32 or 33 and speeding up the circulating display of symbol 35) to continuously output this display data DH switched to the remote commander 3.

The remote commander 3 drives the display unit 26 depending on this display data. The compact disc player body 2 proceeds to step SP33 to the continue searching function.

Under the above condition, when continuous pressing operation of the operation key 19 or 20 is terminated at step SP34, the remote commander 3 issues the cancellation code at the next step SP35, which is successively outputted to the compact disc player body 2.

The compact disc player body 2 stops the searching function at step SP36 corresponding to operation described above, and starts reproducing operation at the next step SP37, and then proceeds to step SP38 to switch the display data DH to the display data of reproduction mode (i.e., the display data displaying the symbol 35 slowly circulating).

The remote commander 3 continuously outputs the cancellation code within the limit of 15 seconds at the next step SP39 for a period after starting to issue this cancellation code till the display data is received, and when the display data of reproduction mode is received, stops to output the control data at step SP40.

Thus, since it is not necessary to continuously output the control data during a period in which the operation key 19 or 20 is pressed continuously, the system control circuit 68 of the remote commander 3 can efficiently output the control data, so that the work load required for outputting control data can be decreased and the processing, such as key scan, etc., can be certainly executed.

(5) Other Embodiments

The embodiment described above is related to the case of transmitting the control data composed of display data from the compact disc player body 2 to the remote commander 3. However, this invention is not only limited to this, but also widely applicable to the case of transmitting various control data.

Furthermore, the embodiment described above has related with the case of key scan processing in utilizing a period in which meaningless data is received. However, this invention is not only limited to this, but also various processings can be performed as occasion demands.

Moreover, the embodiment described above has related to the case of demodulating the control data and wireless transmitting to transmit and receive data between the remote commander 3 and the compact disc player body 2. However, this invention is not only limited to this, but also it may be remote controlled via infrared rays and furthermore, it may be controlled via wire.

Moreover, the embodiment described above has related with the case of applying this invention to the compact disc player. However, this invention is not only limited to this, but is also widely applicable to the case of transmitting data for various electronic equipment, such as a portable tape recorder and others.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data transmitting apparatus for serial transmitting transmission data having m bits from a transmitting device to a receiving device, comprising:

means for converting the transmission data having m bits into a conversion data having a frame including $h+d+(n+d) \times p$ bits, the transmission data being divided into p blocks and each block having n bits, p being equal to m/n when m is a multiple of n, p being equal to $\{INT (m/n)\}+1$ when m is not divisible by n, $\{INT(m/n)\}$ being an integer rounded down, n being equal to $INT(m^{1/2})$ rounded down or rounded up, h being a header having n+1 bits, d being a discrimination code being positioned between said header and one of said blocks and between successive blocks; and a transmission unit for transmitting said conversion data.

2. The data transmitting apparatus according to claim 1, wherein;

said converting means adds dummy data having a predetermined length to said conversion data.

3. The data transmitting apparatus according to claim 2, wherein;

said converting means adds idle data having a predetermined length so that said conversion data has a fixed bit length.

4. The data transmitting apparatus according to claim 1, wherein;

said transmission data is display data.

5. The data transmitting apparatus according to claim 1, wherein;

said data transmission unit is part of an audio apparatus, and said transmission data is display data showing an operating condition of said audio apparatus.

6. The data transmitting apparatus according to claim 5, wherein;

said audio apparatus is a disc player.

7. A data receiving apparatus, comprising:

a receiving device for receiving conversion data transmitted from a transmitting device, said conversion data including:

transmission data having m bits divided into p blocks with each block having n bits, p being equal to m/n when m is divisible by n, p being equal to $\{INT(m/n)\}+1$ when m is not divisible by n, $\{INT(m/n)\}$ being an integer rounded down, n being equal to $INT(m^{1/2})$ rounded down or rounded up, and a header h having n+1 bits and a discrimination code having d bits, the discrimination code being positioned after said header and between successive blocks;

wherein the conversion data has a frame with $h+d+(n+d) \times p$ bits therein, and said header h indicating a data sequence for each frame.

8. The data receiving apparatus according to claim 7, further comprising:

a device for performing a preset process;

said conversion data including dummy data having a predetermined length;

the device for performing the preset process performing said preset process during a time said dummy data is received.

9. The data receiving apparatus according to claim 7, wherein:

said receiving device is a wireless remote controller with headphones; and the transmission data transmitted from said transmitting device is display data showing an operating condition of the transmitting device.

10. The data receiving apparatus according to claim 8, wherein;

said device for performing the preset process is an operation unit provided in the receiving device.

11. A transmission method for transmitting transmission data having a predetermined length of m bits from a transmitting apparatus to a receiving apparatus, comprising the steps of:

dividing the transmission data having m bits into p blocks with each block having n bits, p being equal to m/n when m is divisible by n, p being equal to $\{INT (m/n)\}+1$ when m is not divisible by n, $\{INT (m/n)\}$ being an integer rounded down, n being equal to $INT(m^{1/2})$, $INT(m^{1/2})$ being an integer rounded down or rounded up;

adding a header h having n+1 bits and a discrimination code having d bits to the divided transmission data to form conversion data, the discrimination code d being added after said header and between successive blocks, said conversion data having a frame with bits therein; and transmitting said conversion data.

12. The transmission method according to claim 11, further comprising the step of: adding dummy data having a predetermined length to said conversion data.

13. The transmission method according to claim 12, further comprising the step of: adding idle data having a second predetermined length to said conversion data so that said conversion data has a fixed bit length.

14. A transmitting and receiving method comprising the steps of:

dividing transmission data having m bits into p blocks with each block having n bits, p being equal to m/n when m is divisible by n, p being equal to $\{(INT(m/n)\}+1$ when m is not divisible by n, $\{INT (m/n)\}$ being an integer rounded down, n being equal to $INT(m^{1/2})$ rounded down or rounded up;

adding a header h having n+1 bits and a discrimination code having d bits to said divided transmission data to form conversion data, the discrimination code being added after said header and between successive blocks, said conversion data having a frame with $h+d (n+d) \times p$ bits therein;

transmitting the conversion data with a transmitter;

receiving the transmitted conversion data with a receiver; and detecting a data sequence per frame of the received conversion data on the basis of said header h.

15. The transmitting and receiving method according to claim 14, further comprising the steps of:

adding dummy data having a predetermined length to said conversion data before said transmission;

receiving the dummy data; and performing a predetermined process during a time said dummy data is received by said receiver.

* * * * *

UNITED STATES PATENT AND TRADEMARK OFFICE
CERTIFICATE OF CORRECTION

PATENT NO. : 5,652,766
DATED : July 29, 1997
INVENTOR(S) : Matsumura, et al

It is certified that error appears in the above-indentified patent and that said Letters Patent is hereby corrected as shown below:

In Col. 20, line 42, after "with" please add $--h + d + (n + d) \times p--$

Signed and Sealed this

Sixteenth Day of September, 1997

Attest:

BRUCE LEHMAN

Attesting Officer

Commissioner of Patents and Trademarks